US012330074B2

(12) United States Patent
Frieberger et al.

(10) Patent No.: US 12,330,074 B2
(45) Date of Patent: Jun. 17, 2025

(54) GAME OF CHANCE CLAW MACHINE

(71) Applicant: Arcadia Gaming Solutions Ltd., RaAnana (IL)

(72) Inventors: Itai Frieberger, Batzra (IL); Avey Gabrielli, Tel Mond (IL); Shaul Wilenski, Tel-Aviv (IL); Aaron Faktor, Tzofit (IL)

(73) Assignee: Arcadia Gaming Solutions Ltd., RaAnana (IL)

( * ) Notice: Subject to any disclaimer, the term of this patent is extended or adjusted under 35 U.S.C. 154(b) by 0 days.

(21) Appl. No.: 18/726,157

(22) PCT Filed: Jan. 1, 2023

(86) PCT No.: PCT/IL2023/050002

§ 371 (c)(1),
(2) Date: Jul. 2, 2024

(87) PCT Pub. No.: WO2023/126946

PCT Pub. Date: Jul. 6, 2023

(65) Prior Publication Data

US 2025/0065221 A1 Feb. 27, 2025

Related U.S. Application Data

(60) Provisional application No. 63/295,903, filed on Jan. 2, 2022.

(51) Int. Cl.
*A63F 9/30* (2006.01)
*A63F 5/00* (2006.01)
(Continued)

(52) U.S. Cl.
CPC .................. *A63F 9/30* (2013.01); *A63F 5/00* (2013.01); *G07F 17/3262* (2013.01); *G07F 17/3297* (2013.01); *A63F 2009/2442* (2013.01)

(58) Field of Classification Search
CPC ...... A63F 9/30; A63F 5/00; A63F 2009/2442; G07F 17/3262; G07F 17/3297
See application file for complete search history.

(56) References Cited

U.S. PATENT DOCUMENTS 9,962,601 B2 * 5/2018 Jones ...................... A63F 5/046
10,565,830 B1 * 2/2020 Georgilas ............ G07F 17/3297
(Continued)

FOREIGN PATENT DOCUMENTS

WO WO 2023/126946 7/2023

OTHER PUBLICATIONS

International Preliminary Report on Patentability Dated Jul. 11, 2024 From the International Bureau of WIPO Re. Application No. PCT/IL2023/050002 (7 Pages).
(Continued)

*Primary Examiner* — Michael D Dennis

(57) ABSTRACT

A claw machine including a cabinet adapted to hold multiple objects on a horizontal surface in a non-overlapping manner. Each one of the objects are visually marked with a unique identifier. A human machine interface adapted to identify a user or a player election held during a game event that is indicative of the multiple identifiers. A processing circuitry connected to a claw machine gantry assembly and adapted to instruct the claw machine gantry assembly to maneuver the claw according to a random or a pseudo random pattern until the claw grips one of the objects during the game event. A sensing mechanism adapted to identify which of the plurality of objects is gripped by the claw during the game event.

12 Claims, 4 Drawing Sheets

(51) Int. Cl.
*A63F 9/24* (2006.01)
*G07F 17/32* (2006.01)

(56) References Cited

U.S. PATENT DOCUMENTS

| | | | | |
|---|---|---|---|---|
| 10,593,161 | B1 | 3/2020 | Shocmaker, Jr. | |
| 2004/0048659 | A1* | 3/2004 | Seelig ................ | G07F 17/3295 463/25 |
| 2017/0312623 | A1 | 11/2017 | Wci | |
| 2018/0330577 | A1* | 11/2018 | Shoemaker, Jr. ... | G07F 17/3251 |
| 2020/0111281 | A1 | 4/2020 | Jones | |
| 2022/0343733 | A1 | 10/2022 | Leupp et al. | |

OTHER PUBLICATIONS

International Search Report and the Written Opinion Dated Apr. 4, 2023 From the International Searching Authority Re. Application No. PCT/IL2023/050002 (9 Pages).

* cited by examiner

GAME OF CHANCE CLAW MACHINE

RELATED APPLICATION APPLICATIONS

This application is a National Phase of PCT Patent Application No. PCT/IL2023/050002 having International filing date of Jan. 1, 2023, which claims the benefit of priority under 35 USC § 119 (e) of U.S. Provisional Patent Application No. 63/295,903 filed on Jan. 2, 2022. The contents of the above applications are all incorporated by reference as if fully set forth herein in their entirety.

FIELD AND BACKGROUND OF THE INVENTION

The present disclosure, in some embodiments thereof, relates to a claw machine and, more specifically, but not exclusively, to a game of chance implemented on the claw machine.

SUMMARY OF THE INVENTION

It is an object of the present invention to provide an apparatus, a system, a computer program product, and a method for a claw machine and, more specifically, but not exclusively, to a game of chance implemented on the claw machine.

The foregoing and other objects are achieved by the features of the independent claims. Further implementation forms are apparent from the dependent claims, the description and the figures.

A claw machine including a cabinet adapted to hold multiple objects on a horizontal surface in a non-overlapping manner. Each one of the objects are visually marked with a unique identifier. A human machine interface adapted to identify a user or a player election held during a game event that is indicative of the multiple identifiers. A claw machine gantry assembly having a claw, a motor for moving the claw along a forward and backwards axis and a left and right axis and a pulley to change a height of the claw in relation to the horizontal surface. A processing circuitry connected to the claw machine gantry assembly and adapted to instruct the claw machine gantry assembly to maneuver the claw according to a random or a pseudo random pattern until the claw grips one of the objects during the game event. A sensing mechanism adapted to identify which of the plurality of objects is gripped by the claw during the game event. The processing circuitry is adapted to determine an outcome of the game event based on the player election and the object gripped by the claw and to instruct presenting an indication of the outcome to the player in response to the determination.

The game event may be a game of roulette or other game of chance. An electronic table game and a button may provide the human machine interface and the player election. The sensing mechanism may be located in the claw machine, gantry assembly or in an actuator of the claw. The sensing mechanism may sense a RF tag included in each one of the plurality of identifiers. The processing circuitry determines the control signals to apply to the claw, the motor and the on pulley responsive to an object sensed by the sensing mechanism.

A method for a claw machine, the method includes multiple objects that are held on a horizontal surface of a claw machine in a non-overlapping manner. Each one of objects are visibly marked with multiple identifiers. An election from a player is inputted during a game event that is indicative of the identifiers. Upon receiving the election, a claw of a claw machine gantry assembly is moved along a forward and back axis and a left and right axis and moving a pulley to change a height of the claw in relation to the horizontal surface. The movement of the claw is according to a random or a pseudo random pattern until the claw grips one of the objects during the game event. Identifying an object gripped by the claw during the game event by use of a sensing mechanism that includes multiple sensors. Determining an outcome of the game event. The outcome based on the election and the object gripped by the claw, to present an indication of the outcome to the player in response to the determining.

The game event may be a game of roulette or other game of chance. The input of the player election may be provided from an electronic table game and a button. The sensors of the sensing mechanism may be included in the claw machine, the gantry assembly and/or an actuator of the claw. The sensing mechanism may sense a RF tag included in each one of the plurality of identifiers. The moving of the claw and the sensing of the sensors of the sensing mechanism determines a control signal to apply to the claw, the motor and the pulley.

According to a first aspect, a game of chance is combined with the features of a claw machine to enable a player prior to a game event to choose which object they want as a prize since the objects may be utilized as transparent containers to hold various prizes.

According to a second aspect, through a human machine interface an indication may be made to the player to indicate the odds that the claw will grab the prize and offer the opportunity for the player to make changes in their choice(s).

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DESCRIPTION OF SPECIFIC EMBODIMENTS OF THE INVENTION

Figure 1:
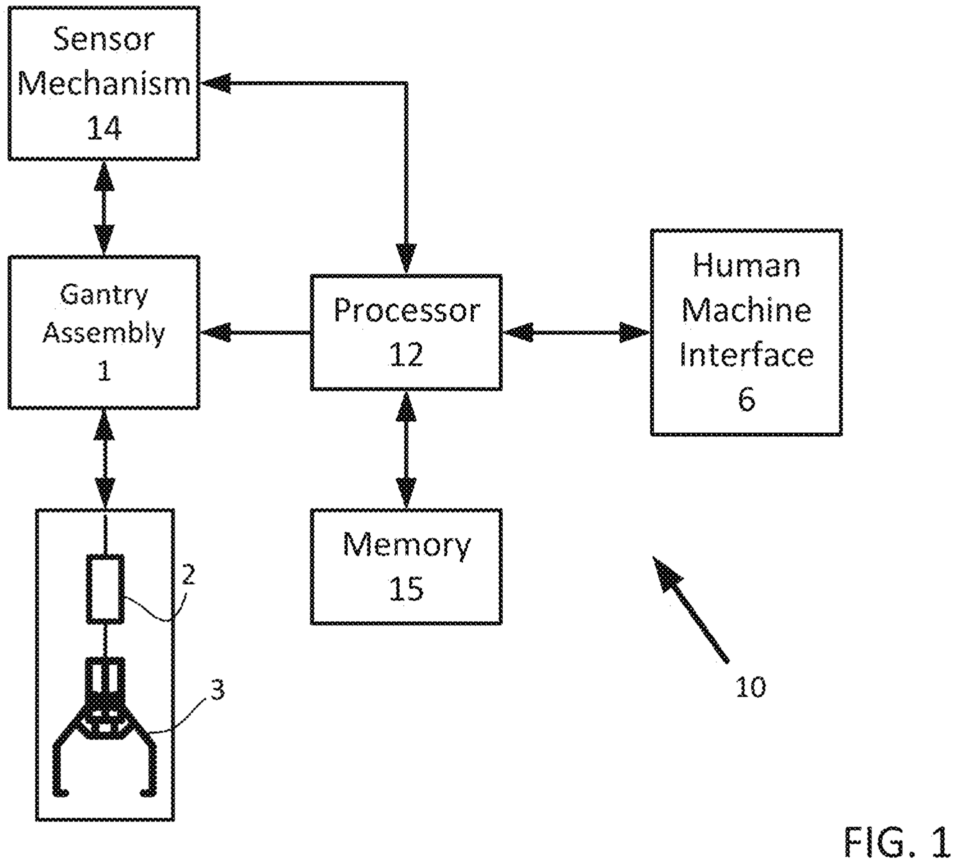
FIG. 1 is a system block diagram of a claw machine, in accordance with some embodiments.

The present disclosure, in some embodiments thereof, relates to a claw machine and, more specifically, but not exclusively, to a game of chance implemented on the claw machine.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By way of introduction aspects of the disclosure below, describe a processing circuitry connected to a claw machine and a gantry assembly of the claw machine attached to a claw and pulley arrangement suspended over a horizontal surface. The horizontal surface includes multiple objects that may be utilized as transparent containers to hold various prizes labelled with visible labels that uniquely identify the object with a number. A human machine interface allows a player to select a particular object and its number from a group of uniquely labeled objects prior to the moving of the claw by the placement of a bet as to which object may be selected at random. The placement of the bet is accompanied with an indication of the odds that particular object chosen will be grabbed by the claw. An algorithm running on the processing circuitry is configurable to instruct the gantry assembly to maneuver the claw according to a random or a pseudo random pattern until the claw grips one of the objects during the game event. If the object grabbed by the claw corresponds with the number and/or color chosen by the player, a win has occurred. The win may cause a grabbed object to be moved over to an aperture of the claw machine and the claw releases the object to the player out of a prize outlet of the claw machine. The win however, may be a partial win, the partial win may be defined as when an object grabbed, corresponds in the players choice of the object being in a range of numbers, is an even or odd number range or is a certain color (black or red) for example. The partial win may cause a printer outlet to dispense a printed ticket to indicate what the partial win is, instead of the claw releasing, object 4 to the player out of the prize outlet, and the object 4 being replaced back on the horizontal surface. For the partial win a coin or token may be released out of the prize outlet or another outlet of the claw machine instead.

In the description that follows, reference is made to a physical implementation of a claw machine. However, the physical claw machine may be implementable in an online interactive graphical form such as an application on a smart phone or an online browser. So for example, the movement of the claw after the selection of an object by pressing of a virtual button may be displayed in a three dimensional (3D) format on the screen of the smart phone or the online browser. A win of a physical object indicated by the online interactive graphic grabbed by the claw may be linked to an online provision to supply the physical object won to be sent to a player via the postal system for example. Other wins may be given in terms of extra game credits to the players account or for the player to receive an electronic money such as a bit coin for example.

Reference is now made to FIG. 1, which is a system block diagram of a claw machine 10, in accordance with some embodiments. A processor 12 connects electrically and bidirectionally to a memory 15. Processor 12 may be a microprocessor, microcontroller, digital signal processor (DSP) or central processing unit (CPU). Connections between blocks can be electrical and/or or mechanical, the direction of connection indicated by arrowheads. Where a double arrowhead indicates a bidirectional connection and a single arrowhead indicates a unidirectional connection. Claw machine 10 may implement the acts of a method or an algorithm described herein by processor(s) 12 executing code instructions stored in memory 15. A sensor mechanism 14 that includes a sensor interface and multiple sensors that connect electrically to processor 12 and connects electrically to gantry assembly 1. The sensors may be located at various locations of claw machine 10 to sense various parameters. Gantry assembly 1 electrically connects to processor 12 and electro-mechanically to pulley 2 and claw 3.

Gantry assembly includes multiple motors that receive control signals from processor 12. The motors may be stepper motors or servomotors. The motors and their actuation according to the algorithm may move gantry assembly 1 in a horizontal plane backwards, forwards, left, and right. The motors and their actuation according to the algorithm also move claw 3 up and down perpendicular to the horizontal plane via the use of pulley 2. The motors and their actuation according to the algorithm also causes an actuator included in claw 3 to cause claw 3 to grab or release on object (not shown) in its vicinity. The movement of gantry assembly 1 may be before the movement of claw 3 or at the same time during a game event or at the end of a game event. Some of the sensors for example may be located in an actuator of claw 3 in order to decide to grab or release on object (not shown) during or at the end of a game event. Human machine interface 6 connects electrically to processor 13. Human machine interface 6 may include a slot to receive a coin or token from a user or a player in order to initiate a game event. Human machine interface 6 may further include an outlet and buttons for the player to make various choices to further initiate the game event. The outlet to dispense a printed to ticket to indicate a win of the game event or the outlet may dispense an object grabbed by claw 3 to indicate the win of the game event.

Figure 2:
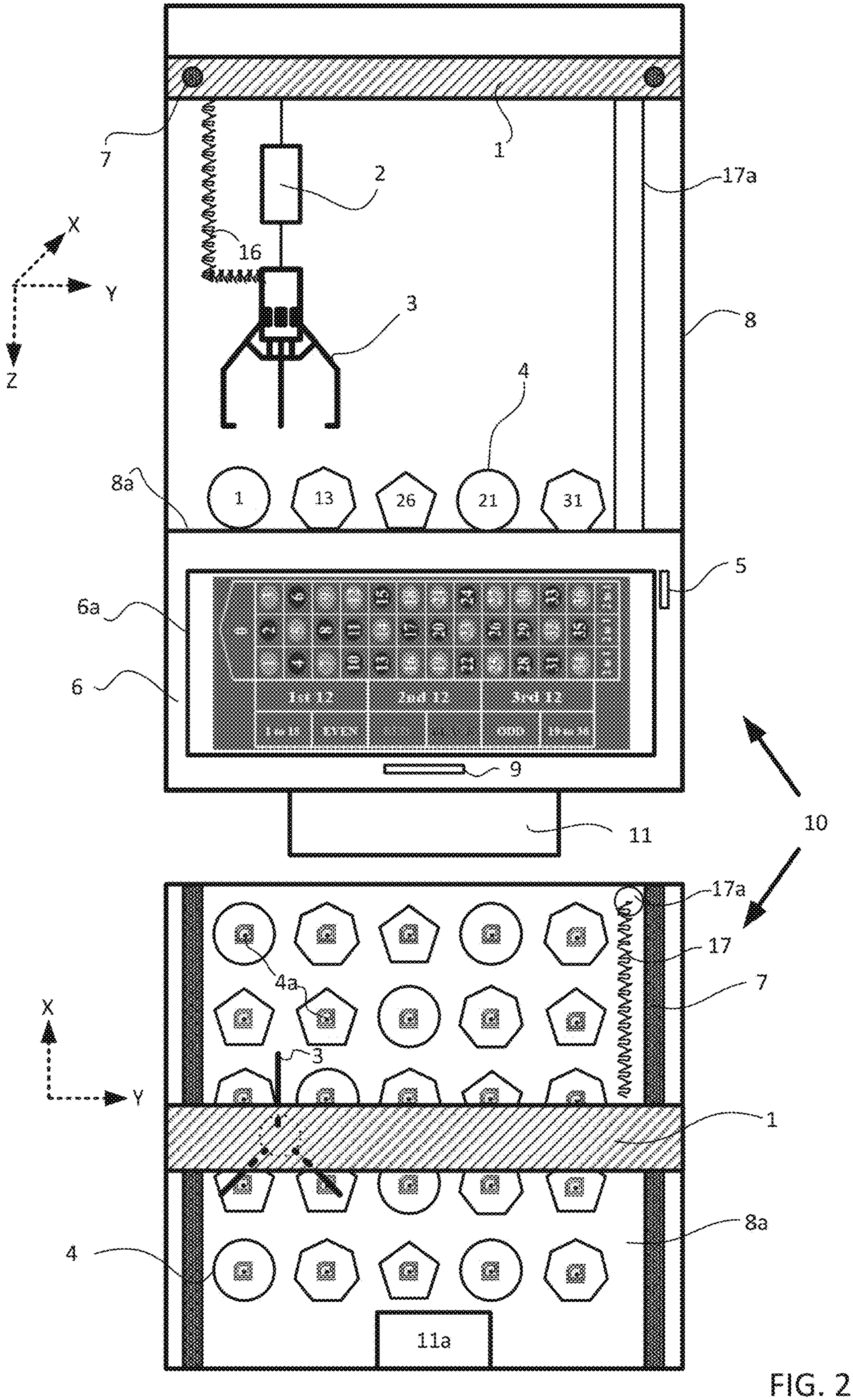
FIG. 2 shows a side and plan view of components of a claw machine, in accordance with some embodiments.

Reference is also made to FIG. 2, which shows a side and plan view of components of a claw machine 10, in accordance with some embodiments. In the side view, claw machine 10 includes a transparent portion of cabinet 8, through which can be seen gantry assembly 1 which includes motors (not shown) to enable gantry assembly 1 to move backwards and forwards along sliders 7 in the horizontal XY plane along the X-axis. A pulley 2 mechanically attaches at one end to gantry assembly 1 and at the other end to claw 3. A coiled cable 16 connects mechanically and electrically between the actuator of claw 3 and gantry assembly 1. Coiled cable 16 includes wires to provide electrical power to the actuator of claw 3, wires to provide control signals to the actuator of claw 3 and wires to convey signals from a sensor located near the actuator of claw 3 to the sensor interface connected to gantry assembly 1. A further motor and sliders located in gantry assembly 1 (not shown), enables pulley 2 and claw 3 to move left and right along sliders in the horizontal XY plane along the Y-axis.

Further with respect to the side view in the horizontal XY plane in cabinet 8 is horizontal surface 8*a*. On top of horizontal surface 8*a* are multiple objects 4. Objects 4 are evenly distributed over horizontal surface 8*a*. Objects 4 are labelled with a unique number and color (red, black or green). The unique numbers ranges from one to thirty-six (1-36 or zero (0) or double zero (00)). Below horizontal surface 8*a* is human machine interface 6 that connects electrically to processor 13 (not shown). Processor 13 may be located in the area underneath horizontal surface 8*a* in a non-transparent portion of cabinet 8. Human machine interface 6 may include a coin slot 5 to receive a coin or token from a player in order to initiate a game event. Human machine interface 6 may further including buttons for the player to make various choices for a continuation of the game event and a printer outlet 9. The buttons may be presented in the form of a graphical user interface (GUI) that includes a touch screen 6*a*. Touch screen 6*a* shows a layout for a roulette table which includes the unique numbers ranges from one to thirty-six (1-36 or zero (0) or double zero (00)) that correspond with objects 4 that are labelled with a unique number (1-36 or zero (0) or double zero (00)) and color (red or black). Printer outlet 9 may dispense a printed to ticket to indicate a win of the game event or a prize outlet 11 may dispense an object 4 grabbed and released by claw 3 to indicate the win of the game event.

With respect to the plan view coiled cable 17 passes through conduit 17*a* to connect processor 12 to gantry assembly 1 and to provide power and control signals to gantry assembly 1. Objects 4 are evenly distributed over horizontal surface 8*a*. Objects 4 are further labelled with a unique radio frequency (RF) tag 4*a* which corresponds with the number value of the labels visibly labelled with a unique number (1-36 or zero (0) or double zero (00)) and color (red, black or green). An RF tag sensor located in claw 3 and/or gantry assembly 1 connected to the sensor interface, may be used to locate claw 3 over an object in the XY plane to enable claw 3 to identify and grab an object 4 at random. If the object 4 corresponds with the number chosen by the player, a win has occurred. The win may cause a grabbed object 4 to be moved over to aperture 11*a* that connects to prize outlet 11. Claw 3 then releases object 4 to the player out of prize outlet 1. The win may be a partial win, the partial win may be defined as when object 4 grabbed, corresponds in the players choice of object 4 being numbers 1-12, is an even number in numbers 1-12 or is a certain color (black or red) for example. The partial win may cause printer outlet 9 to dispense a printed to ticket to indicate what the partial win is, instead of claw 3 releasing, object 4 to the player out of prize outlet 11, and instead object 4 may be replaced back on horizontal surface 8*a*. For the partial win a coin or token may be released out of prize outlet 11 or another outlet (not shown) in human machine interface 6 instead.

Figure 3A:
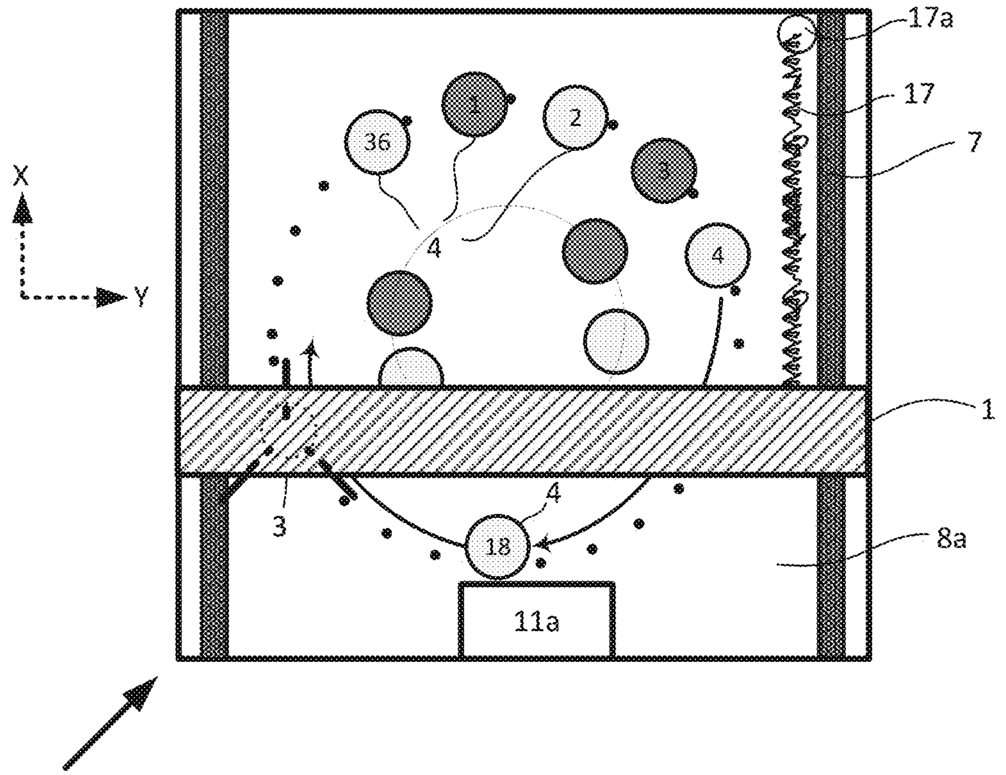
FIG. 3A shows a plan view of components of a claw machine, in accordance with some embodiments.

Reference is also made to FIG. 3A, which shows a plan view of components of a claw machine 10, in accordance with some embodiments. The plan view is the same as the plan view of FIG. 2 except objects 4, ranging from 1-36 or zero (0) or double zero (00) may be arranged in a roulette format in an outer circle. Further inner circles of objects 4 may be included that correspond to other potential wins chosen by a player.

Figure 3B:
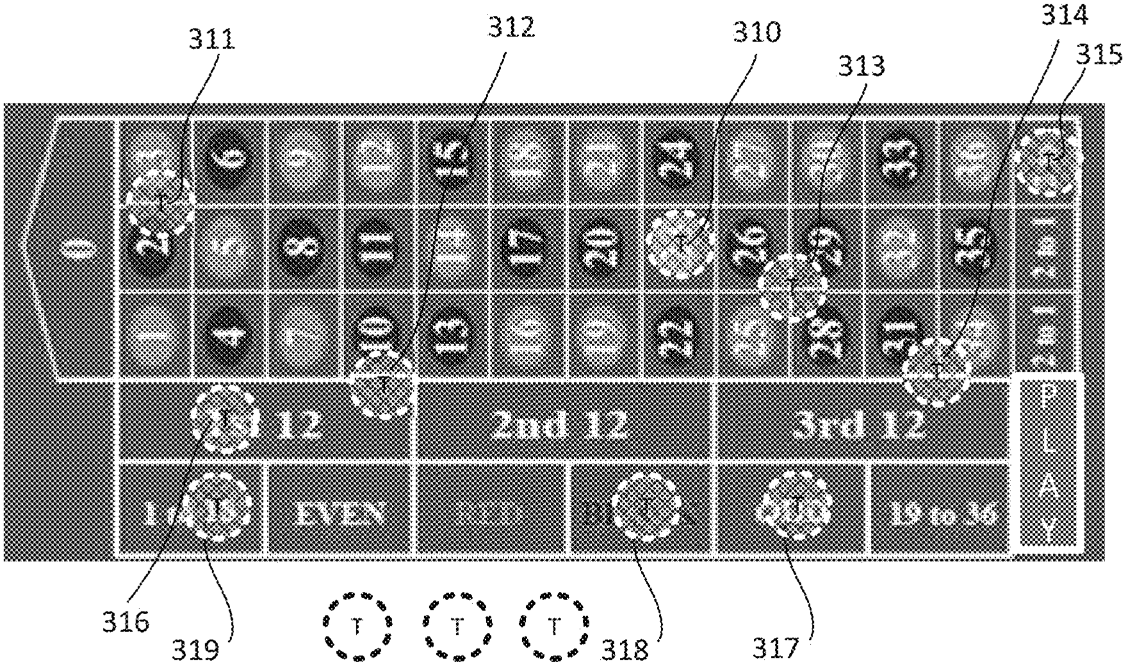
FIG. 3B shows details of touch screen included in human machine interface, in accordance with some embodiments.

Reference is also made to FIG. 3B, which shows details of touch screen 6*a* included in human machine interface 6, in accordance with some embodiments. Human machine interface 6 is provided in the form of a graphical user interface (GUI) that includes a touch screen 6*a*. Touch screen 6*a* shows a layout for a roulette table as it relates objects 4, ranging from 1-36 or zero (0) or double zero (00) may be arranged in roulette wheel format in the outer circle format as shown in FIG. 3A. The buttons of human machine interface 6, swiping a button or a selection region presented by touch screen 6*a*. Alternatively, the player may place chips T to make various bets in the various selection regions. The number of chips available to place bets on may be in accordance with the number of coins or tokens inserted by a player into slot 5. A chip T is shown placed upon number 23, showing the players choice of selecting the object 4 labelled as number 23 that may be grabbed by claw 3 during the game event. Once the player is happy with their making of various bets in the various selection regions by placing a chip in those selection regions, the player will press the play button and the game event continues or if too much time has elapsed human machine interface 6 makes a random default choice for the player.

The type of bets by placement of a chip T can be categorized in two areas; inside bets and outside bets. Inside bets include:

1. Single number bets where a player may wager on any individual number by placing a chip T on top of that number. A chip T 310 placed on the number 23 shows an example of a single number bet. The payout ratio of getting claw 3 to stop and pick up object 4 labelled as '23' with the single number bet is thirty six to one (36:1) or 37 or 38:1 according to European or American rules respectively.
2. Split bets are made by placing a chip T on any two numbers that are adjacent on the roulette board, and can be made by placing a chip T on the horizontal or vertical line between those two numbers. An example of a split bet is shown by placing a chip T 311 between adjacent numbers 2 and 3. The payout ratio of getting claw 3 to stop and pick up object 4 labelled as '2' or '3' is seventeen to one (17:1).
3. Street bets made on any row of three numbers on the roulette table, and can be made by placing a chip T on the edge of that row. An example of a street bet is shown by placing a chip T 312 on the edge to select object with numbers 10, 11 and 12. The payout ratio of getting claw 3 to stop and pick up object 4 labelled as '10' or '11' or '12' is eleven to one (11:1).
4. Corner Bets or Square Bets are made on a square of four numbers on the roulette board, and can be made by placing a chip T on the point shared by those four numbers. An example of a corner bet is shown by placing a chip T 313 on the point. The payout ratio of getting claw 3 to stop and pick up object 4 labelled as '25' or '26' or '28 or '29" is eight to one (8:1).
5. Six line bet is made on two adjacent lines of three numbers each, for a total of six numbers, by placing chips at the intersection between the two lines along the side of the board. An example of a six line bet is shown by placing a chip T 314 on chips at the intersection between the two lines along the side of the board. The payout ratio of getting claw 3 to stop and pick up object 4 labelled as '31' or '32' or '33 or '34' or '35 or '36' is five to one (5:1).

Outside bets are focused away from the individual numbers on the roulette table. Outside bets are less risky than inside bets, but also come with lower payout wins. Outside bets include:

1. Column bets that covers one of the three columns of 12 numbers found on the roulette wheel. An example of a six line bet is shown by placing a chip T 314 on the two to one (2 to 1) in order to select numbers 3, 6, 9, 12, 15, 18, 21, 24, 27, 30, 33, and 36. The payout ratio of getting claw 3 to stop and pick up object 4 labelled as 3, 6, 9, 12, 15, 18, 21, 24, 27, 30, 33, or 36 is two to one (2:1).
2. Dozens bets cover one of three groups of 12 numbers (1-12, 13-24, and 25-36). If any number in that range wins, the odds are two to one (2:1). An example of a dozen bet is shown by placing a chip T 316 on the 1$^{st}$ 12 area in order to select numbers 1-12.
3. Odd/even bets cover all odd numbers or even numbers respectively. An example of an odd bet is shown by placing a chip T 317 on the 'EVEN' area. The payout ratio of getting claw 3 to stop and pick up object 4 labelled with an even number is two to one (2:1).
4. Red/black bets cover all numbers that have objects 4 of the appropriate color (Red or Black). If any number of that color wins, the bet pays even money. An example of a black bet is by placing a chip T 318 on the 'BLACK' area. The payout ratio of getting claw 3 to stop and pick up object 4 labelled with a BLACK number is two to one (2:1).
5. 1-18 or 19-36 bets cover all numbers in the ranges suggested by their names. An example of a 1-18 bet is by placing a chip T 319 on the '1 to 18' area. The payout ratio of getting claw 3 to stop and pick up object 4 labelled with number 1-18 is two to one (2:1).

Figure 4:
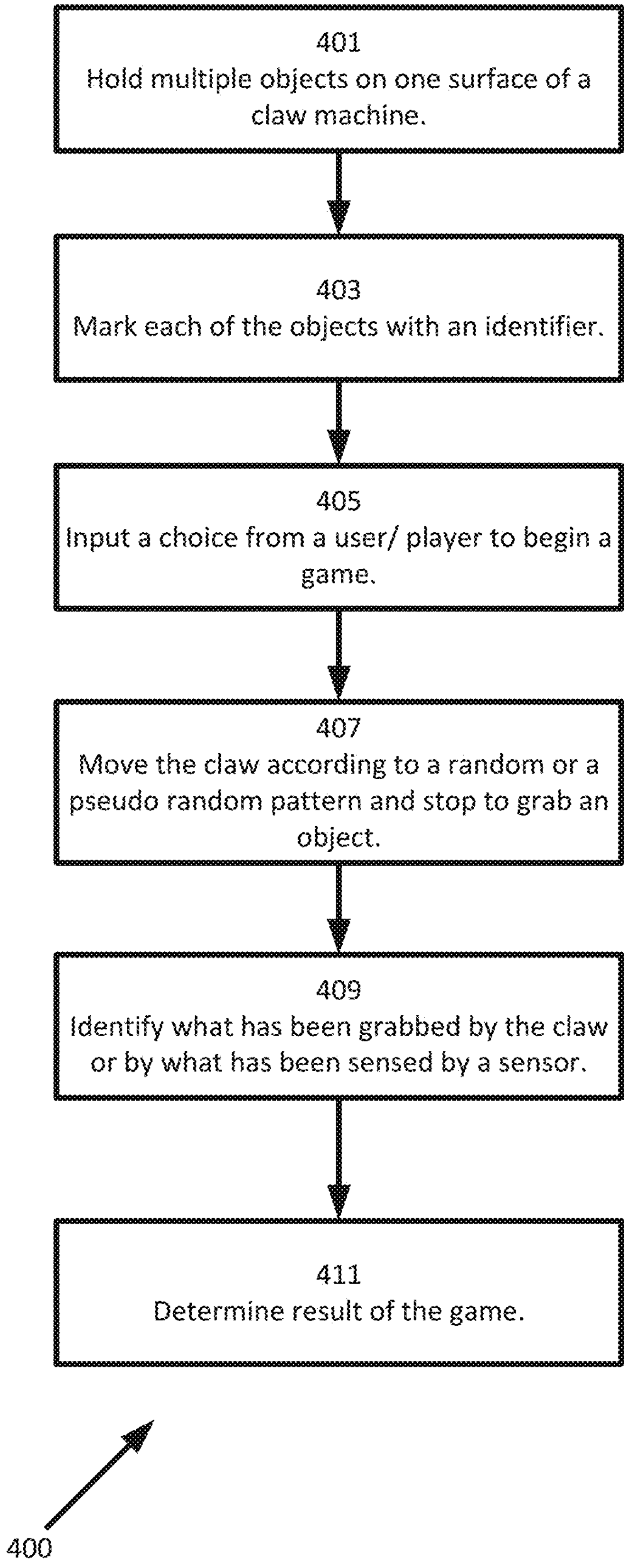
FIG. 4 shows a method for a claw machine, in accordance with some embodiments.

Reference is also made to FIG. 4, which shows a method 400 for claw machine 10, in accordance with some embodiments. Claw machine 10 may implement the acts of method 300 described herein by processor(s) 12 executing code instructions stored in a memory 15. Method 400 is described herein by way of non-limiting example with reference to the use of human machine interface 6 is provided in the form of a graphical user interface (GUI) that includes a touch screen **6*a*** that shows a layout for a roulette table.

At step 401, multiple objects 4 are evenly distributed over horizontal surface **8*a* and are visible through the transparent portion of cabinet 8. Objects 4 may be evenly distributed over horizontal surface 8*a* as shown in FIG. 3A to form a roulette wheel layout in an outer circle. Objects 4 may be evenly distributed over horizontal surface 8*a* in another game of chance format. Gantry assembly 1 includes motors and can be seen through the transparent portion of cabinet 8. The motors enable gantry assembly 1 operably attached to claw 3 via pulley 2** to move backwards and forwards, left and right in the horizontal XY plane along the X and Y axis respectively.

At step 403, touch screen **6*a* displays to the player the unique numbers ranges from one to thirty-six (1-36 or zero or double zero (00)) that correspond with objects 4 that are visibly labelled to display a numerical identifier to a player. The identifier is a unique number (1-36 or zero or double zero (00)) and color (red, black or green) for each object 4. Objects 4 may be further labelled with a unique radio frequency (RF) tag 4*a*** that corresponds with the number value of the visible labels with the unique number (1-36 or zero or double zero (00)) and color (red, black or green).

At step 405, upon insertion of a coin or a token by a player into slot 5, a game event maybe initiated. The game event is facilitated by graphical user interface (GUI) that includes a touch screen **6*a*. Touch screen 6*a* informs the player of the potential prize outcome prior to selection of the player by pressing or swiping a button or a selection region presented by touch screen 6*a*. Touch screen 6*a* shows a layout of selection regions for a roulette table. The layout includes the unique numbers ranging from one to thirty-six (1-36 or zero or double zero (00)) that correspond with objects 4** that are labelled with a unique number (1-36 or zero or double zero (00)) and color (red or black).

Where a specific number is chosen by the player, the choice of the specific number may correspond to an object 4 which may be in a transparent container to show a physical prize; watch, ring, or money for example, contained inside object 4. Where other selection regions are chosen by the player, in reference to FIG. 3A, further inner circles of objects 4 may be included on surface 8*a* that correspond to other potential wins by placement of chips T chosen and placed on the selection regions of touch screen 6*a* to make a bet by a player. As discussed above, a bet can be categorized in two areas; inside bets and outside bets.

The further inner circles of objects 4 on horizontal surface 8*a* may be in a transparent container to show a physical prize of lesser value such a cuddly toy etc. Further, where other the other selection regions are chosen by the player from touch screen 6*a*, printer outlet 9 may dispense a printed ticket to indicate a partial win of the game event. Grabbed object 4 of the numbers labelled 1-36 may be replaced back on horizontal surface 8*a* and another appropriate object 4 grabbed from the inner circles and dispensed through outlet 11. Alternatively, the partial win may cause a coin or token to be released out of prize outlet 11 or another outlet in human machine interface 6.

At step 407, once the player is happy with their making of various bets in the various selection regions by placing a chip T in those selection regions of touch screen 6*a*, the player will press the play button of touch screen 6*a* and the game event continues. The game event continues by sending signals to the motors of gantry assembly 1 to move backwards and forwards along sliders 7 in the horizontal XY plane along the X-axis. The signals are also sent to a further motor and sliders located in gantry assembly 1, enables pulley 2 and claw 3 to move left and right along sliders in the horizontal XY plane along the Y-axis.

In the case of the layout of objects 4 according to FIG. 3A, the signals applied to the motors under the control of an algorithm running on processor 12 may for example move claw 3 in a circular orbit in the horizontal XY plane above the outer circle of objects 4 labelled as numbers 1-36 or zero or double zero (00). The circular orbit above the outer circle of objects 4 labelled as numbers 1-36 or zero or double zero (00) essentially imitates the rotation of a roulette wheel and hence the connection between the roulette wheel and the layout of the betting table shown in FIG. 3B to enable a player to place bets. The rotation may be clockwise or anti-clockwise or may switch randomly from clockwise to anti-clockwise during the game event and a stop over an object 4, is according to a random or a pseudo random pattern generated by an algorithm stored in memory 15 running on processor 12. The maneuver of claw 3 according to a random or a pseudo random pattern may be in accordance with regulatory requirements and compliance with the regulatory conditions.

Alternatively, according to layout of the plan view in FIG. 2, the distributed layout of objects 4 may be in a matrix format. The numerical value of the label of the objects 4 may be laid out on horizontal surface 8*a* in a random manner or in a contiguous manner so that objects 4 next together in a numerical sequence of 1-36 or zero or double zero (00) or in a greater matrix with a greater numerical sequence. The matrix format for numerical sequence of 1-36 or zero or double zero (00) for thirty-six objects may be in a six-row by six-column format. The orbit of movement of claw 3 above may include the circular orbit above objects 4 and the signals to the motors and their actuation according to an algorithm may move gantry assembly 1 randomly in a horizontal plane backwards, forwards, left, and right. The movement of gantry assembly 1, during a game eventual stop over an object 4, may be according to a random or a pseudo random pattern generated by the algorithm stored in memory 15 running on processor 12.

Once claw 43 has randomly stopped over an object 4, a motor in gantry assembly moveable attached to pulley 2, under control of the algorithm to lower open claw 3 down towards the object 4. The algorithm also causes an actuator included in claw 3 to cause claw 3 to grab, release or re-grab the object 4 in its vicinity.

At step 409, under the control of the algorithm to lower open claw 3 down towards the object 4. An RF tag sensor located in claw 3 and/or gantry assembly 1 connected to the sensor interface, may be used to further locate claw 3 in the XY plane over an object 4 that includes a RF tag. The RF tag identifies the object 4 being grabbed and its label numerical value.

At step 411, if the label numerical value of object 4 sensed and grabbed by claw 3 corresponds with the number or numbers chosen by the player at step 405, a win has occurred. The win from a single number bet causes the grabbed object 4 to be moved over to aperture 11*a* that connects to prize outlet 1. Claw 3 then releases object 4 to the player out of prize outlet 1. The win, however may be a partial win, the partial win may be defined by the other remaining bets from the inside bets and/or outside bets described above. With respect to FIG. 3A, the partial win may cause a further grab from inner circles of objects 4 on horizontal surface 8*a* (in a transparent container) that is a physical prize of lesser value as it corresponds with the partial win from the inside bets and/or outside bets described above. The partial win from the inside bets and/or outside bets causes the physical prize of lesser value to be dispensed out of prize outlet 11. In either case of the win or the partial win, a sensor located in aperture 11*a* may be used to confirm a successful dispensation of a prize to a player. If the dispensation of the prize is unsuccessful a printed ticket may indicate that a win occurred but the object 4 was dropped. The partial win may also cause printer outlet 9 to dispense a printed to ticket to indicate what the partial win is, instead of claw 3 releasing, object 4 to the player out of prize outlet 11, and subsequently object 4 being replaced back on horizontal surface 8*a*. For the partial win, a coin or token may be released out of prize outlet 11 or another outlet (not shown) in human machine interface 6 instead. The win or partial win may also be accompanied with an audible siren or celebratory music and flashing lights to enhance the winning experience of the player(s) and those near claw machine 10.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A claw machine, comprising:

a cabinet adapted to hold at least a plurality of objects on at least one surface in a non-overlapping manner, each one of the plurality of objects are visually marked with one of a plurality of identifiers;

a human machine interface adapted to identify a user election held during a game event and indicative of at least one of the plurality of identifiers;

a claw machine gantry assembly having a claw, at least one motor for moving the claw along a forward and back axis and a left and right axis and at least one pulley to change a height of the claw in relation to the at least one surface;

a processing circuitry connected to the claw machine gantry assembly and adapted to instruct the claw machine gantry assembly to maneuver the claw according to a random or a pseudo random pattern until the claw grips one of the plurality of objects during the game event; and at least one sensing mechanism adapted to identify which of the plurality of objects is gripped by the claw during the game event, wherein the processing circuitry is adapted to determine an outcome of the game event based on the user election and the object gripped by the claw and to instruct presenting an indication of the outcome to the user in response to the determination.

2. The claw machine of claim 1, wherein the game event is at least one of a game of roulette or other game of chance.

3. The claw machine of claim 1, wherein the human machine interface and the user election is provided by at least one of an electronic table game and at least one button.

4. The claw machine of claim 1, wherein the at least one sensing mechanism is located in at least one of the claw machine gantry assembly and an actuator of the claw.

5. The claw machine of claim 1, wherein the at least one sensing mechanism senses a RF tag included in each one of the plurality of identifiers.

6. The claw machine of claim 1, wherein the processing circuitry determines control signals to apply to at least one of the claw, the at least one motor and the at least on pulley responsive to an object sensed by the at least one sensing mechanism.

7. A method for a claw machine, the method comprising:

holding at least a plurality of objects on at least one surface of a claw machine in a non-overlapping manner;

marking visually each one of the plurality of objects with one of a plurality of identifiers;

inputting an election from a user held during a game event indicative of at least one of the plurality of identifiers;

upon receiving the election, moving a claw of a claw machine gantry assembly along a forward and back axis and a left and right axis and moving at least one pulley to change a height of the claw in relation to the at least one surface, wherein the moving is according to a random or a pseudo random pattern until the claw grips one of the plurality of objects during the game event;

identifying by sensing from at least one sensing mechanism, which of the plurality of objects is gripped by the claw during the game event; and determining an outcome of the game event based on the election and the object gripped by the claw and to instruct presenting an indication of the outcome to the user in response to the determining.

8. The method of claim 7, wherein the game event is at least one of a game of roulette or other game of chance.

9. The method of claim 7, wherein the inputting of the user election is provided from at least one of an electronic table game and at least one button.

10. The method of claim 7, wherein the at least one sensing mechanism is included in at least one of the claw machine gantry assembly and an actuator of the claw.

11. The method of claim 7, wherein the sensing senses a RF tag included in each one of the plurality of identifiers.

12. The method of claim 7, wherein at least one of the moving and the sensing determines at least one control signal to apply to at least one of the claw, at least one motor and the at least on pulley.

* * * * *